United States Patent [19]

Yu

[11] Patent Number: 5,564,930

[45] Date of Patent: Oct. 15, 1996

[54] MODULAR COMPUTER CASE

[76] Inventor: Ben H. Yu, No. 14 Industrial Rd., 2, Kuan-yin Ind park., Taoyuan Hsien, Taiwan

[21] Appl. No.: 339,016

[22] Filed: Nov. 14, 1994

[51] Int. Cl.$^6$ ....................................... H05K 1/14
[52] U.S. Cl. ............................. 439/61; 361/686
[58] Field of Search ................... 439/61; 361/683–686, 361/785, 796

[56]      References Cited

U.S. PATENT DOCUMENTS

| | | | |
|---|---|---|---|
| 4,744,006 | 5/1988 | Duffield | 361/586 |
| 5,038,308 | 8/1991 | Le et al. | 361/685 |
| 5,175,669 | 12/1992 | Navia et al. | 361/683 |

*Primary Examiner*—Neil Abrams
*Attorney, Agent, or Firm*—Plante & Strauss

[57]      ABSTRACT

There is disclosed a case (12) for a computer having one of a plurality of removable and interchangeable rear panels (50, 90) which provide apertures for access to I/O ports and slots for access to the rear edges of accessory cards (17, 123) of any of various mother boards (13) such as the IBM, Western Digital or Intel mother boards. For this purpose the case has a window (70) in its rear wall (22) which is generally rectangular with an extension along its lower edge. The window receives one of a plurality of removable and interchangeable panels (50, 90), each panel having a first area which is a generally rectangular recessed wall (74, 118) having a plurality of elongated slots (76, 106) that provide access to the rear edges of accessory cards, and a second area, located along the lower edge of the panel which has one or more apertures (88, 94, 96, 98, 100, 102, 104) to provide access to I/O sockets of a mother board. Each panel has a plurality of tabs (58, 114) with apertures to receive screw fasteners (72, 116) for attachment of the panel to the rear wall of the case. Additionally, the recessed wall of the panels also includes a plurality of threaded apertures (80, 139), one each located adjacent one of the elongated slots for receiving a screw fastener to secure the rear of an accessory card.

9 Claims, 5 Drawing Sheets

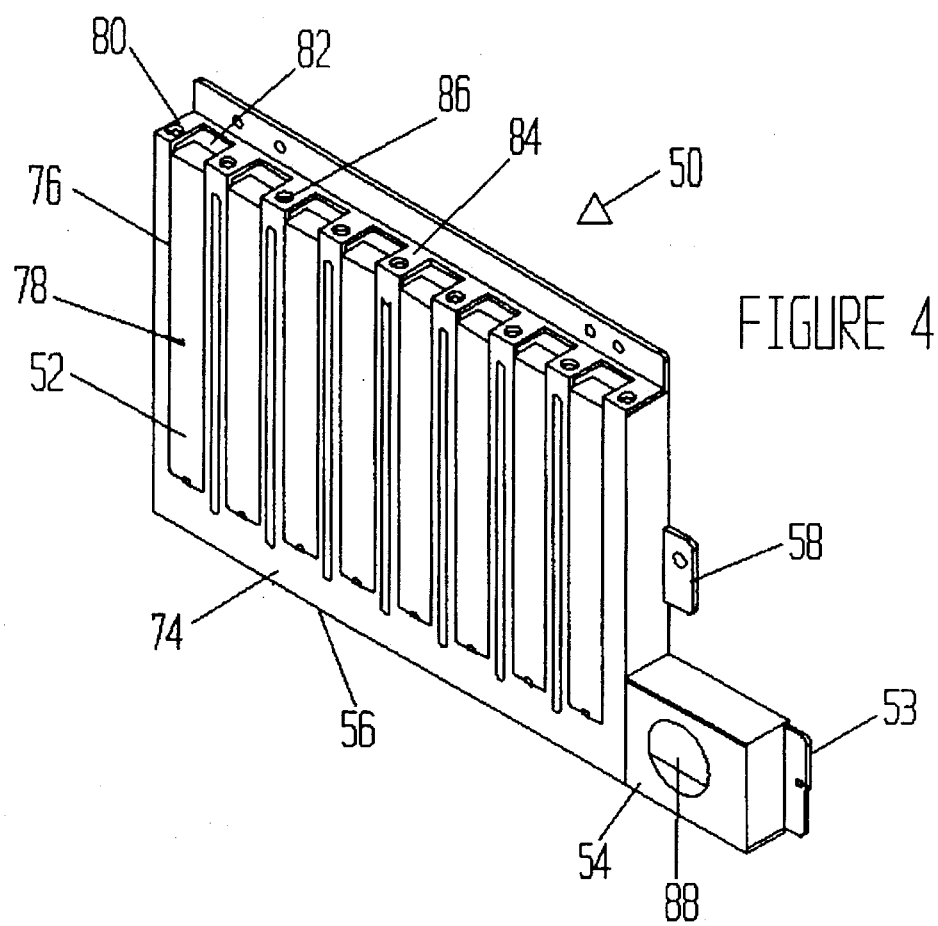
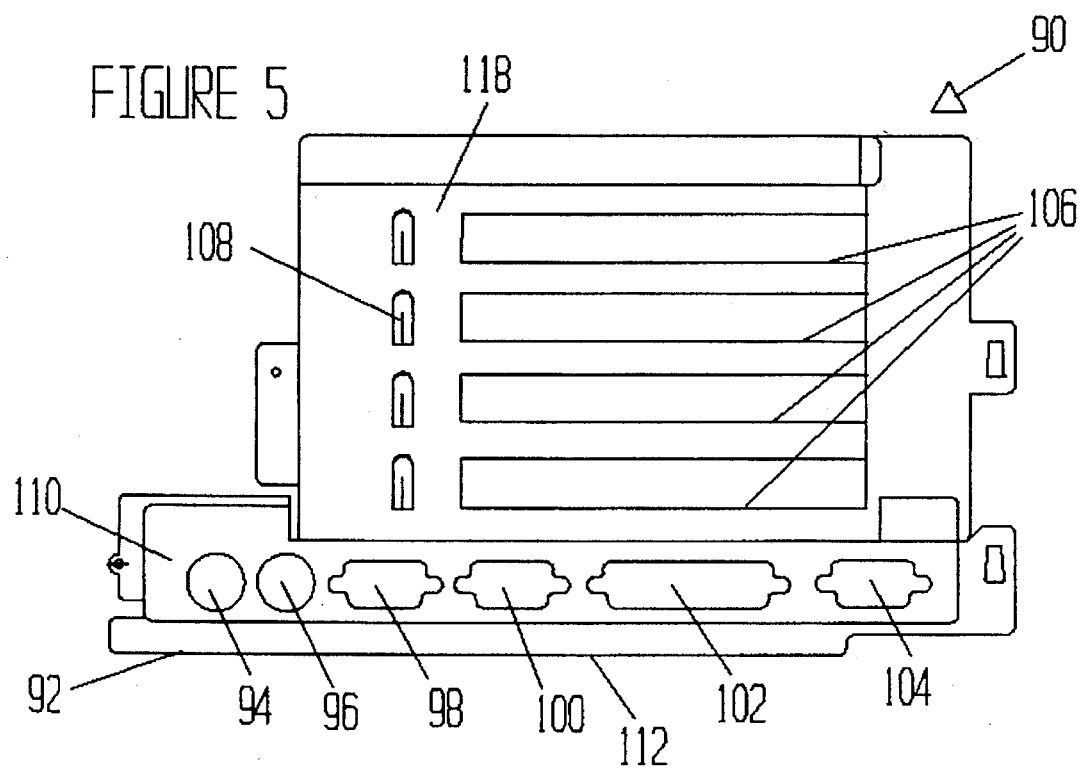

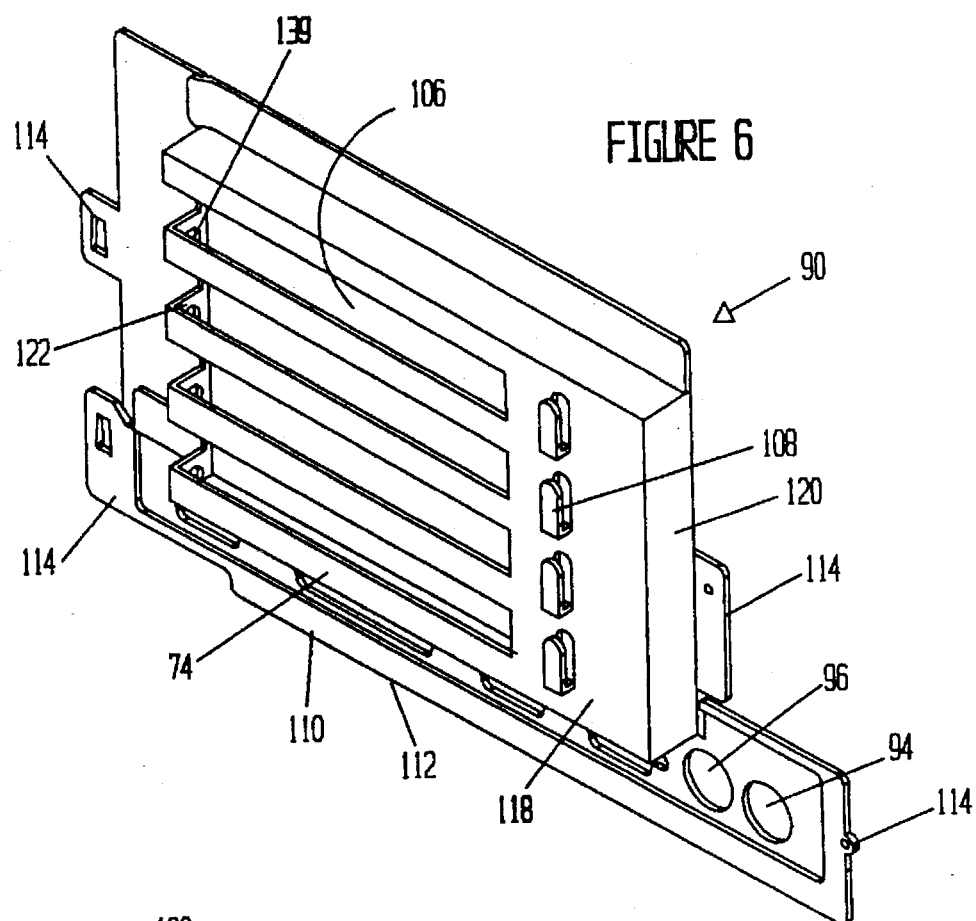
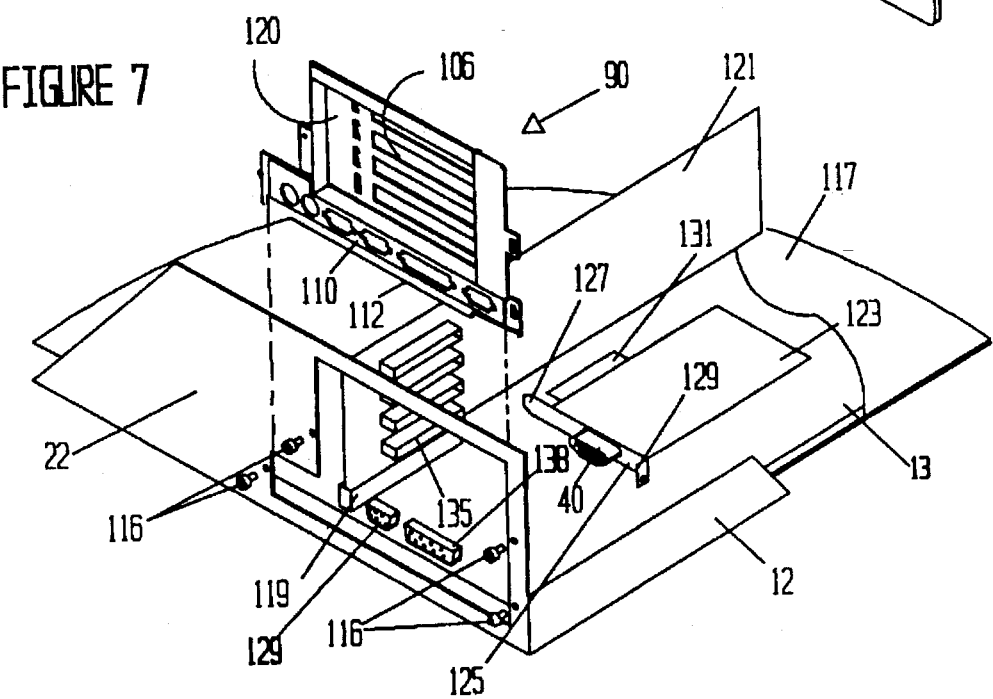

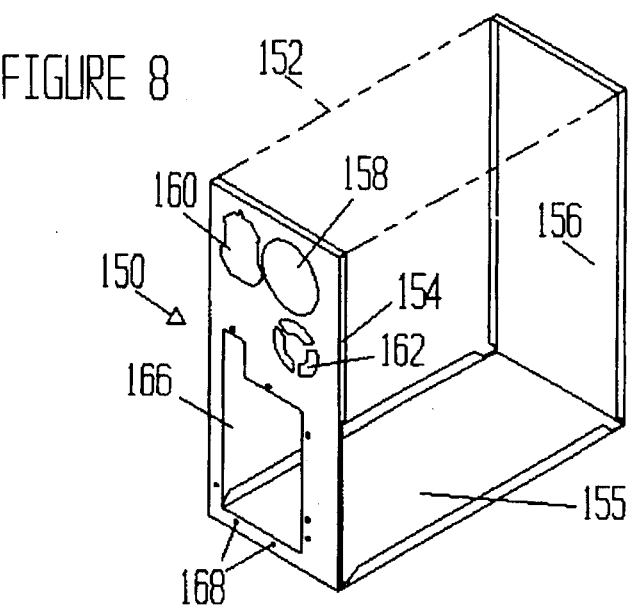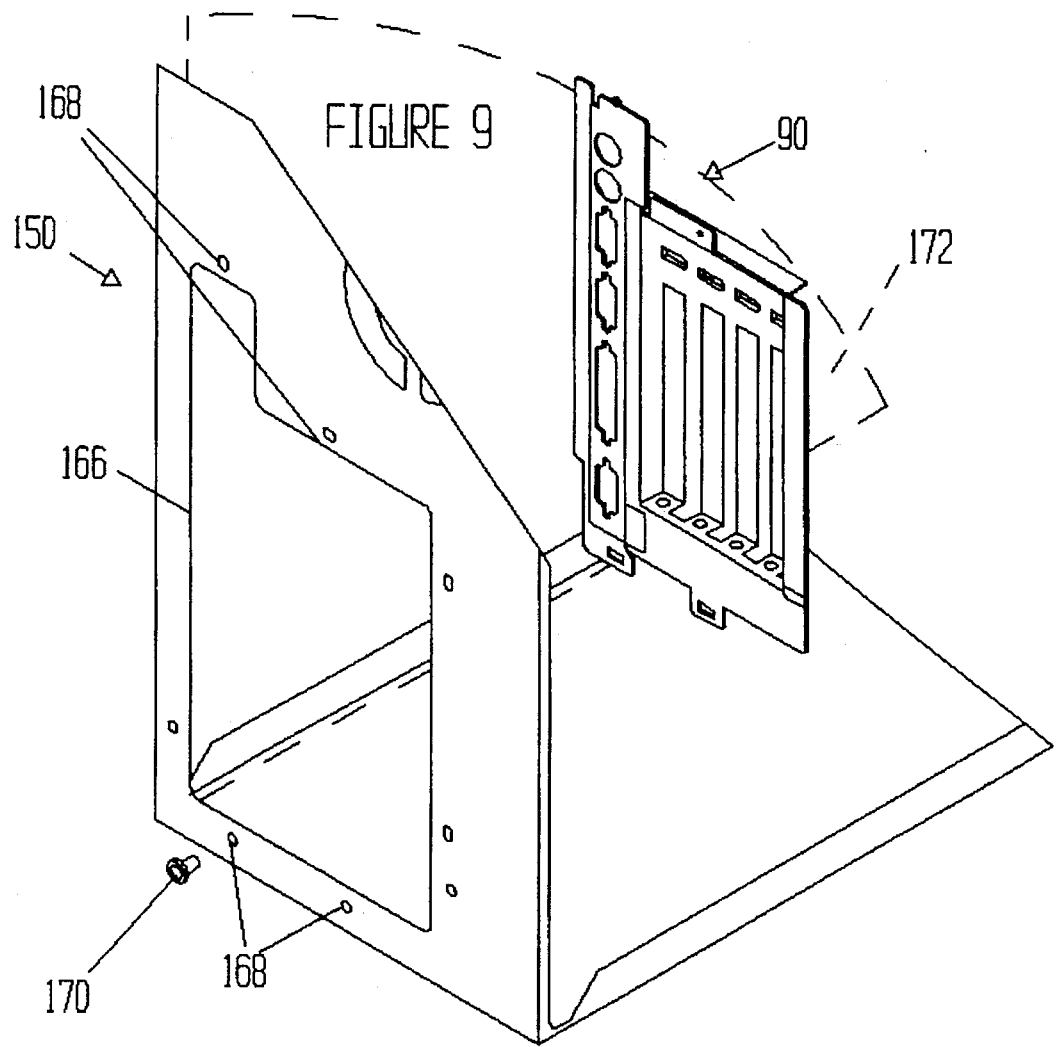

MODULAR COMPUTER CASE

BACKGROUND OF THE INVENTION

1. Field of Invention

This invention relates to a case for a computer and, in particular, to a case with a modular panel permitting interchangeability of computer mother boards.

2. Brief Statement of the Prior Art

The popular personal computer widely used in office and home employs a mother board which is secured to a wall of a computer case. The commonly used computer cases are of two general configurations; a generally flat shape (desk-top) or a vertical or upright shape (tower). In either configuration, the rear wall of the case has one or more apertures to serve interface (I/O) ports which permit connection of peripherals, such as a keyboard, to the mother board. Additionally, the mother board has a plurality of sixteen or thirty-two pin sockets which receive removable accessory cards such as sound cards, graphics cards and cards which are dedicated to specific software programs or to peripherals such as printers, scanners, and the like. The rear edges of the accessory cards often have one or more sockets for connection of plugs attached to cables which extend to a peripheral such as a CRT monitor, modem, scanner, digitizing tablet, printer, etc.

The conventional computer case has an inset panel which has a plurality of slots to provide access to the rear edges of the accessory cards that are seated in the card sockets of the mother board. Commonly, these slots are filled with a "punch-out" plate. The upper edge of the inset panel also has a plurality of threaded apertures to receive screw fasteners that extend through tabs at the upper rear corner of the accessory card to secure the cards firmly in the sockets of the mother board.

The computer case as thus described has been used for quite a few years without any significant modifications since the manufacturers of mother boards have conformed to an industry standard in the location and orientation of the card sockets for the plug-in accessory cards, and of the sockets for peripherals such as keyboards.

Recently, however, some manufacturers of mother boards, notably Intel and Western Digital, have altered the designs for mother boards and have integrated a number of functions such as graphics, serial and parallel interfaces in the mother board using integrated chip sets. Consequently, a number of the I/O ports and functions previously served by accessory cards are now integrated into the mother board which has a plurality of sockets such as 7, 9, and 25 pin sockets which receive connector plugs of peripherals such as monitors, modems, printers, and the like. Additionally, these mother boards are provided with only a single card socket which receives a plug-in buss card. The latter is an accessory card which has a plurality of 32 pin sockets to receive additional plug-in accessory cards, resulting in an orientation of these accessory cards which is parallel, rather than orthogonal, to the mother board. Consequently, the location and orientation of the access slots in the rear panel of the computer case must be changed from their conventional or standard location to accommodate the newer types of mother boards.

Computer owners seek the ability to upgrade computers by replacement of accessories and mother boards. Upgrading to the latest mother boards such as those described above, however, requires replacement of the computer case as that case cannot accommodate mother boards having different locations of the I/O ports and slots for accessory cards. This represents an unnecessary expense and inconvenience.

OBJECTIVES OF THE INVENTION

It is an objective of this invention to provide a computer case having the capability for interchangeability of mother boards.

It is a specific objective of this invention to provide a computer case which has a removable rear panel that can receive any of a plurality of removable and interchangeable panels which are configured for various mother boards.

It is a specific objective of this invention to provide a computer case with a removable rear panel to permit interchangeability between IBM, Intel and Western Digital mother boards.

Other and related objectives will be apparent from the following description of the invention.

BRIEF DESCRIPTION OF THE INVENTION

This invention comprises a case for a computer having one of a plurality of removable and interchangeable rear panels which provide apertures for access to I/O ports and slots for access to the rear edges of accessory cards of any of various mother boards such as the IBM, Western Digital or Intel mother boards. For this purpose the case has a window in its rear wall which is generally rectangular with an extension along its lower edge. The window receives one of a plurality of removable and interchangeable panels, each panel having a first area which is a generally rectangular recessed wall having a plurality of elongated slots that provide access to the rear edges of accessory cards, and a second area, located along the lower edge of the panel which has one or more apertures to provide access to I/O sockets of a mother board. Each panel has a plurality of tabs with apertures to receive screw fasteners for attachment of the panel to the rear wall of the case. Additionally, the recessed wall of the panels also includes a plurality of threaded apertures, one each located adjacent one of the elongated slots for receiving a screw fastener to secure the rear of an accessory card.

BRIEF DESCRIPTION OF THE DRAWINGS

The invention will be described with reference to the figures, of which:

FIG. 4 is a perspective view of the inside surface of the removable and interchangeable panel of FIG. 2;

FIG. 5 illustrates an alternative, removable and interchangeable panel of the invention;

FIG. 6 is a perspective view of the inside surface of the removable and interchangeable panel of FIG. 2;

FIG. 7 is an exploded view of a portion of the computer case, removable panel of FIG. 5 and a portion of a computer mother board and accessory card;

FIG. 8 is a perspective view of a tower type computer case useful in the invention; and FIG. 9 is an exploded view of a portion of the computer case of FIG. 9 illustrating the insertion of the panel of FIG. 5.

DESCRIPTION OF THE PREFERRED EMBODIMENT

Figure 1:
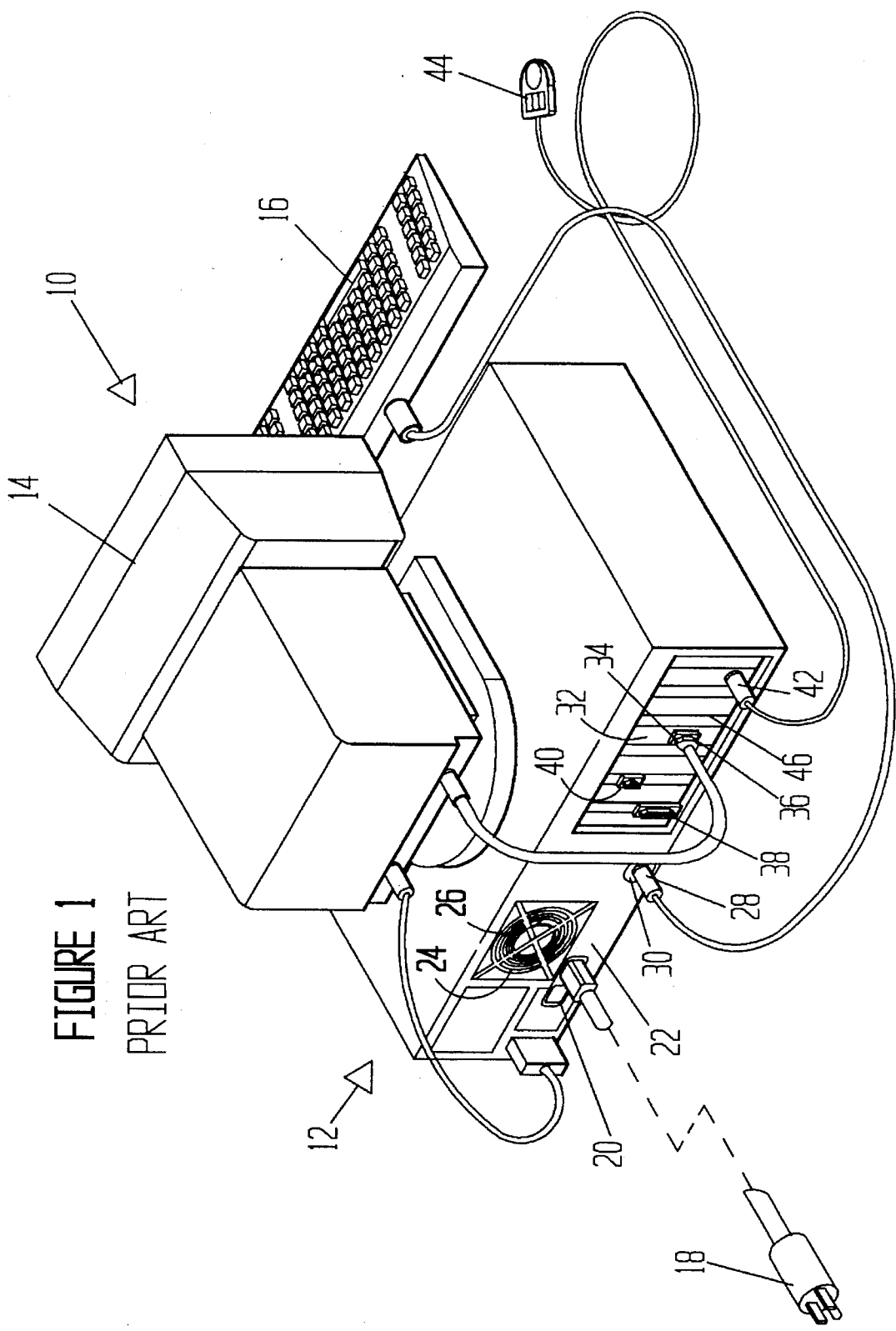
FIG. 1 illustrates a prior art, desk top computer system with a conventional case.

Referring now to FIG. 1, there is illustrated a conventional desk-top computer 10 which has a conventional IBM style mother board. As there illustrated, the computer is housed in a computer case 12 and is provided with accessory or peripheral items such as the CRT monitor 14 and a keyboard 16. The computer case 12 houses a conventional power supply which is connected to a source of 115 volt AC power through a power cable 18 and has a on/off switch 20 on the rear wall 22 of the case 12. The rear wall 22 also supports a cooling fan 24 which is provided with a screened aperture 26 for forced ventilation of the case 12. The keyboard 16 for the computer 10 is connected to the mother board which is contained within the computer case 12 by a connector plug 28 that passes through an aperture 30 in the rear wall 22 of the case 12 and into a socket carried on the mother board. The mother board is provided with a plurality of accessory cards which plug into 16 or 32 pin sockets arranged along one side of the mother board. The accessory cards have narrow plates along their rear edges such as the plate 32 of an accessory card which has a conventional nine-pin video socket 34 that receives the connector plug 36 of the CRT monitor 14. The mother board also receives an accessory card that has one or more I/O ports such as a twenty-five pin parallel socket 38 for connection to a peripheral such as a printer and the like, a conventional seven-pin serial port 40 for connection to a peripheral such as a modem. Additionally, the computer can have an accessory card having a socket 42 for connection of a mouse 44 or graphic input device such as a digitizer.

The rear wall 22 of the conventional computer case 12 is provided with a recessed wall 46, as illustrated for coplanar alignment with the plates on the rear edges of the accessory cards. This panel is commonly permanently attached to the rear wall 22 of the computer case 12.

Figure 2:
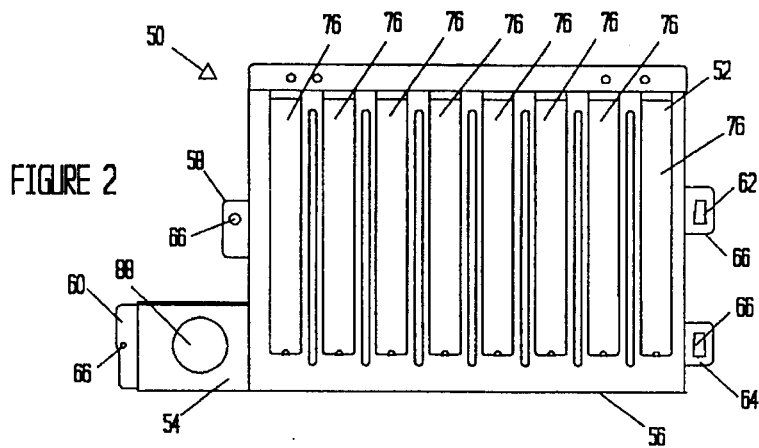
FIG. 2 illustrates a removable and interchangeable panel of the invention.
Figure 3:
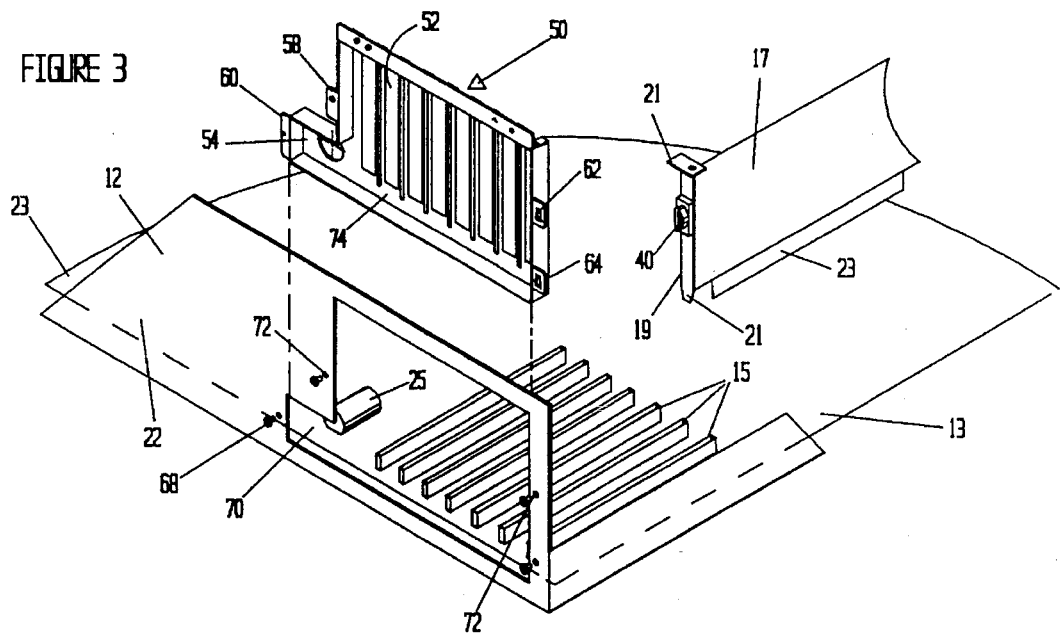
FIG. 3 is an exploded view of a portion of the computer case, removable panel of FIG. 2 and a portion of a computer mother board and accessory card.

Referring now to FIGS. 2–4, there is illustrated a panel 50 of the invention which is of a configuration to adapt to the conventional IBM style mother board. FIG. 3 illustrates the panel adjacent a computer case; and FIG. 4 illustrates the wall of the panel which is located inside the computer case.

The panel 50 has a first area 52 having a generally rectangular shape with an extension area 54 along its lower edge 56 and has a plurality of tabs 58, 60, 62 and 64 each of which has an aperture 66 for receiving a fastening screw 68 such as a sheet metal or machine screw to secure the panel 50 to the rear wall 22 of the computer case 12.

FIG. 3 illustrates the rear wall 22 of the computer case 12 which has a window 70 with a configuration corresponding to the removable and interchangeable panel 50 of the invention. A plurality of threaded apertures 72 are located adjacent the periphery of the window 70 for receiving the fastener screws 68 which secure the panel 50 removably to the rear wall 22.

In FIG. 3, a portion of the mother board 13 is illustrated. The motherboard 13 is secured to an orthogonal wall 23 of the case 12 and has a keyboard socket 25. The motherboard 13 is shown with its parallel array of a plurality of sockets 15 that receive the edge connectors 23 of accessory cards such as card 17 which has a serial I/O port 40 on its rear plate 19. For simplicity of illustration, the circuits and electronic components on the mother board 13 and accessory card 17 are not shown. The rear plate 19 of the accessory card 17 has an orthogonal tab 21 with an aperture to receive a machine screw that secures it to the threaded apertures 86 in the shoulders 84 of the panel 50 (see FIG. 4). At its opposite end, the rear plate 19 has a tang 21 that seats in the case.

As apparent from FIGS. 3 and 4, the panel 50 of the invention has a recessed wall 74 that defines the rectangular area 52 which is provided with a plurality of vertical, parallel slots 76 each of which has a temporary cover plate 78 which can be punched out from the panel 50 to open the slot 76 for access to the rear plate 19 of an accessory card. The upper edge 80 (see FIG. 4) of the recessed wall 74 is also slotted as illustrated at 82 to receive the orthogonal tab 21 of the rear plate 19 of the accessory card 17 and the shoulders 84 between the slots 76 are provided with internally threaded apertures 86 that receive machine screws that secure tabs such as tab 21 to lock the accessory cards in the mother board, as in the conventional placement and securing of these accessory cards.

The panel 50 of the invention also has at least one through aperture 88 in the extension area 54 which provides an I/O port for access to a socket on the mother board of the computer. As illustrated in FIGS. 3 and 4, this extension area 54 of the panel 50 is also recessed from the rear wall of the computer in proximity to the socket of the IBM style mother board.

Referring now to FIGS. 5 through 7, there is illustrated a panel 90 of the invention which is used interchangeably with the panel 50 shown in FIGS. 2 through 4. The panel 90 shown in FIGS. 5 through 7 is useful with mother boards 13 which are provided with a plurality of sockets such as 129 and 131 for I/O ports that connect to conventional chip sets such as the LPM and LPX chip sets which have been integrated on mother boards recently introduced by Western Digital. As illustrated in FIG. 5, the lower edge 92 of the panel 90 has an aperture 94 for access to a socket that receives the connector of a conventional keyboard, an aperture 96 for access to a socket that receives a connector plug of a mouse, two apertures 98 and 100 that provide access to two serial sockets, an aperture 102 for access to a parallel socket, and an aperture 104 for access to a socket for a graphics plug such as a VGA connector plug.

FIG. 6 is a perspective view of the inside surface of the panel 90. As there illustrated, the panel 90 has two areas; the recessed wall 118 which is provided with a plurality of horizontal slots 106 in a parallel array and a non-recessed extended area 110 along its lower edge 112 which is provided with the aforementioned I/O apertures.

As shown in FIG. 7, the mother board 117 has a single socket 119 for receiving a buss card 121 which has a plurality of 32 pin sockets 135 which receive the edge connector 131 of accessory cards, such as card 123, which are positioned in a generally parallel alignment above the plane of the mother board. Each of the slots 106 in the panel 90 is also provided with an adjacent hook or prong 108 (see FIG. 6) that receives the tang 127 of the rear plate 125 of an expansion card, such as card 123 which has a conventional serial port 40.

The panel 90 has a plurality of tabs 114 having apertures which align with apertures of the case and which receive machine screws 116 for fastening the panel to the rear wall 22 of the case, as previously described and illustrated in FIG. 3. Also as mentioned, the recessed wall 118 of the panel 90 has a plurality of prongs 108 which are punched from the metal to form supports for the narrow plate on the rear edge of the accessory cards. The horizontal slots 106 in the recessed wall 118 of the panel 90 extend into slots in the end wall of the pocket 120 formed by the recessed wall 118 and the resulting shoulders 122 of this wall are provided with threaded apertures 139 which receive machine screws for securing the orthogonal tabs of the rear plates of accessory cards.

The invention is also applicable to tower computer cases such as shown in FIGS. 8 and 9. As there illustrated, the computer base cabinet 150 has a cover 152, shown in phantom lines. The base cabinet 150 has a rear wall with a large aperture 158 for a power supply cooling fan, an aperture 160 for the power supply connector and power switch, an aperture 162 for a second cooling fan, and a window 166 for the removable and interchangeable panels of the invention.

As shown in FIG. 9, interchangeable panel 90 is illustrated in exploded view, as it would be installed in the case with machine screws 170 which extend through apertures 168 in the rear wall of the cabinet 150 which are aligned with the apertures in tabs 114 (see FIG. 6) of panel 90.

It is, of course, apparent that interchangeable panel 50 could be substituted for panel 90, depending on the configuration of the mother board selected for the computer.

Since the panels are removable and interchangeable and since the windows in the rear wall of the computer case can receive any of the interchangeable panels, the computer case becomes useful for any of the various mother boards including the IBM type mother board, or the more recently introduced Intel and Western Digital mother boards which have the sockets for accessory boards carried on a buss card and which thereby locate the accessory cards in a stacked, horizontal array rather than in the more conventional vertical array of the IBM style mother boards. Additionally, the interchangeable panels permit the designer to incorporate any of a plurality of I/O ports which are necessary for connection to the various sockets located on the mother board. In this manner, the computer case can be readily used in upgrades by permitting swapping of the mother board without replacement of the case.

While the invention has been illustrated with the conventional desk-top computer case it is likewise equally applicable to tower cases.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A computer case having a front, sides, rear, top and bottom walls which is adaptable to a plurality of different types of mother boards which comprises:

a. a base cabinet having a rear and orthogonal wall with attachment means to secure a mother board to the inside of said orthogonal wall;
   b. an opening in said rear wall adjacent one end thereof;
   c. an opening extension together with said opening defining a substantially L-shaped area;
   d. a plurality of interchangeable panels, with a selected one of which is removably secured to said rear wall with each of said interchangeable panels having a first panel wall covering said opening and an extension panel wall together with said first panel wall defining a substantially L-shaped area matching and covering said opening and opening extension, with at least one of said plurality of panels having a plurality of slots in said first panel wall which are oriented parallel to said orthogonal wall and a second of said plurality of panels having a plurality of slots which are oriented perpendicular to said orthogonal wall, with attachment means to secure said panel to said rear wall;
   e. said plurality of slots being disposed in a parallel array extending across said first panel wall at preselected locations corresponding to the location of the rear edges of accessory cards mounted to said mother board; and
   f. at least one aperture in said extension panel wall corresponding to the location of an I/O socket of said mother board.

2. The computer case of claim 1 wherein said first panel wall is recessed from the planar surface of said rear wall.

3. The computer case of claim 1 wherein each of said panels has apertures in said extension panel wall corresponding to the I/O sockets of a respective one of a plurality of different mother boards.

4. The computer case of claim 1 wherein said first panel wall is recessed from the planar surface of said rear wall, and said extension panel wall is coplanar with said rear wall.

5. The computer case of claim 1 wherein said first panel wall and said extension panel wall are recessed from the planar surface of said rear wall.

6. The computer case of claim 1 wherein said apertures in said extension panel wall of said panel include apertures which align with parallel and serial I/O sockets on said mother board.

7. The computer case of claim 6 wherein said apertures in said extension wall of said panel include apertures which align with a graphics device socket of said mother board.

8. The computer case of claim 1 wherein said aperture in said extension panel wall of said panel aligns with a keyboard socket on said mother board.

9. The computer case of claim 7 wherein said apertures in said extension panel wall of said panel include an aperture which aligns with a keyboard socket on said mother board.

\* \* \* \* \*